United States Patent
Taylor

(10) Patent No.: US 9,768,543 B2
(45) Date of Patent: Sep. 19, 2017

(54) CABLE END TERMINATION INCLUDING CABLE DIELECTRIC LAYER HERMETIC SEAL AND RELATED METHODS

(71) Applicant: SRI Hermetics LLC, Melbourne, FL (US)

(72) Inventor: Edward A. Taylor, Melbourne, FL (US)

(73) Assignee: SRI HERMETICS, LLC, Melbourne, FL (US)

( * ) Notice: Subject to any disclaimer, the term of this patent is extended or adjusted under 35 U.S.C. 154(b) by 0 days.

(21) Appl. No.: 15/381,936

(22) Filed: Dec. 16, 2016

(65) Prior Publication Data

US 2017/0179633 A1    Jun. 22, 2017

Related U.S. Application Data

(60) Provisional application No. 62/268,891, filed on Dec. 17, 2015.

(51) Int. Cl.
*H01R 9/05* (2006.01)
*H01R 13/52* (2006.01)
*H01R 43/20* (2006.01)

(52) U.S. Cl.
CPC .......... *H01R 13/521* (2013.01); *H01R 43/20* (2013.01)

(58) Field of Classification Search
CPC .................................. H01R 24/38; H01R 9/05
USPC .................. 439/578, 887, 891, 628
See application file for complete search history.

(56) References Cited

U.S. PATENT DOCUMENTS

| | | | |
|---|---|---|---|
| 2,896,186 A | 7/1959 | Hardmark | |
| 4,138,183 A * | 2/1979 | Soos | H01R 13/533 439/161 |
| 4,690,482 A | 9/1987 | Chamberland et al. | |
| 4,725,239 A * | 2/1988 | Shichida | H01R 39/64 439/29 |
| 5,163,856 A * | 11/1992 | McGaffigan | B23K 3/0475 219/616 |
| 5,563,562 A * | 10/1996 | Szwec | H01R 24/44 174/152 GM |
| 5,824,953 A | 10/1998 | Han et al. | |
| 5,842,881 A * | 12/1998 | Ecker | H01R 12/775 29/825 |
| 6,071,144 A | 6/2000 | Tang | |
| 6,590,471 B1 | 7/2003 | Scharen et al. | |

(Continued)

*Primary Examiner* — Phuong Dinh
(74) *Attorney, Agent, or Firm* — Allen, Dyer, Doppelt + Gilchrist, P.A.

(57) ABSTRACT

A cable end termination is for a coaxial cable that includes inner and outer conductors and a dielectric layer therebetween that is subject to outgassing in a vacuum environment. The cable end termination may include a tubular bi-metallic body that includes a first longitudinal portion including a first metal and a second longitudinal portion joined with the first longitudinal portion and that includes a second metal having a different coefficient of thermal expansion (CTE) than the first metal. The tubular bi-metallic body may have a first end receiving the coaxial cable and a second end opposite the first end that carries a dielectric body to define a hermetic seal for the dielectric layer in the vacuum environment. A center pin contact may extend through the dielectric body, and a center conductor contact may couple the center pin contact to the inner conductor.

20 Claims, 2 Drawing Sheets

(56) References Cited

U.S. PATENT DOCUMENTS

| | | | | |
|---|---|---|---|---|
| 7,601,006 B2* | 10/2009 | Christoffersen | ...... | H01R 13/187 439/32 |
| 7,674,132 B1* | 3/2010 | Chen | ................... | H01R 9/0524 439/578 |
| 7,798,848 B2* | 9/2010 | Islam | ................... | H01R 4/5075 439/578 |
| 7,803,018 B1* | 9/2010 | Islam | ..................... | H01R 13/15 439/578 |
| 7,952,035 B2* | 5/2011 | Falk | ................... | H01R 13/5216 174/650 |

* cited by examiner

CABLE END TERMINATION INCLUDING CABLE DIELECTRIC LAYER HERMETIC SEAL AND RELATED METHODS

RELATED APPLICATIONS

The present application claims the priority benefit of provisional application Ser. No. 62/268,891 filed on Dec. 17, 2015, the entire contents of which are herein incorporated in its entirety by reference.

TECHNICAL FIELD

The present invention relates to the field of electronics, and, more particularly, to cable connectors and related methods.

BACKGROUND

For some electronic applications it may be desirable to operate in a vacuum environment. Electronic applications for a vacuum environment may require specialized components, for example, connectors, cables, etc. so as to reduce or avoid contamination of the vacuum environment by the components. For example, contamination of the vacuum environment may occur from air pockets captured by the components placed in the vacuum environment and/or outgassing of the components over time. To address this, one approach is to use a hermetic bulkhead connector with a seal that is terminated to a non-hermetic cable. However, a non-hermetic cable may be subject to outgassing, and thus may contaminate the vacuum environment.

A standard semi-rigid coaxial cable, for example, is generally not hermetic and thus cannot be used in a vacuum environment for the reasons stated above, although with respect to electrical performance, a standard semi-rigid coaxial cable is desirable. To protect the integrity of the vacuum environment, it is generally desirable that a cable used in the vacuum environment be fabricated using methods and materials that result in reduced electrical performance.

SUMMARY

A cable end termination for a coaxial cable may include an inner conductor, an outer conductor, and a dielectric layer therebetween, the dielectric layer being subject to outgassing in a vacuum environment. The cable end termination may include a tubular bi-metallic body that includes a first longitudinal portion having a first metal and a second longitudinal portion joined with the first longitudinal portion and including a second metal having a different coefficient of thermal expansion (CTE) than the first metal. The tubular bi-metallic body may have a first end receiving the coaxial cable and a second end opposite the first end. A dielectric body may be carried within the second end to define a hermetic seal for the dielectric layer of the coaxial cable in the vacuum environment. The cable end termination may also include a center pin contact extending through the dielectric body, and a center conductor contact coupling the center pin contact to the inner conductor of the coaxial cable. Accordingly, the cable end termination may provide a hermetic seal for the dielectric layer of the coaxial cable in the vacuum environment, for example, so that connections to the terminations may be made using non-hermetic connectors that may be available commercially off the shelf.

The center conductor contact may have opposing first and second openings to slidably receive the inner conductor and the center pin contact therein, respectively. At least one of the first and second metals has a CTE within ±10% of the dielectric body, for example. At least one of the first and second metals may have a CTE within ±10% of the outer conductor of the coaxial cable.

The tubular bi-metallic body may have a stepped passageway between the first and second ends. The stepped passageway may define at least one shoulder for receiving the coaxial cable thereagainst, for example.

The dielectric body may include glass. At least one of the first and second metals may include nickel, cobalt, iron, titanium, aluminum, steel, and copper.

A method aspect is directed to a method of assembling the cable end termination for a coaxial cable that includes an inner conductor, an outer conductor, and a dielectric layer therebetween. The dielectric layer may be subject to outgassing in a vacuum environment. The method may include coupling a center conductor contact to the inner conductor of the coaxial cable. The method may also include coupling the center conductor contact to a tubular bi-metallic body that including a first longitudinal portion including a first metal and a second longitudinal portion joined with the first longitudinal portion and comprising a second metal having a different coefficient of thermal expansion (CTE) than the first metal. The tubular bi-metallic body may have a first end receiving the coaxial cable and a second end opposite the first end, and the tubular bi-metallic body may have a dielectric body carried within the second end to define a hermetic seal for the dielectric layer of the coaxial cable in the vacuum environment and a center pin contact extending through the dielectric body.

Another method aspect is directed to a method of making the cable end termination for a coaxial cable that includes an inner conductor, an outer conductor, and a dielectric layer therebetween. The dielectric layer is subject to outgassing in a vacuum environment. The method may include forming a tubular bi-metallic body that includes a first longitudinal portion comprising a first metal and a second longitudinal portion joined with the first longitudinal portion and comprising a second metal having a different coefficient of thermal expansion (CTE) than the first metal. The tubular bi-metallic body may be formed to have a first end receiving the coaxial cable and a second end opposite the first end. The method may also include positioning a dielectric body to be carried within the second end to define a hermetic seal for the dielectric layer of the coaxial cable in the vacuum environment, and positioning a center pin contact to extend through the dielectric body. The method may further include positioning a center pin contact to couple the center conductor contact to the inner conductor of the coaxial cable.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
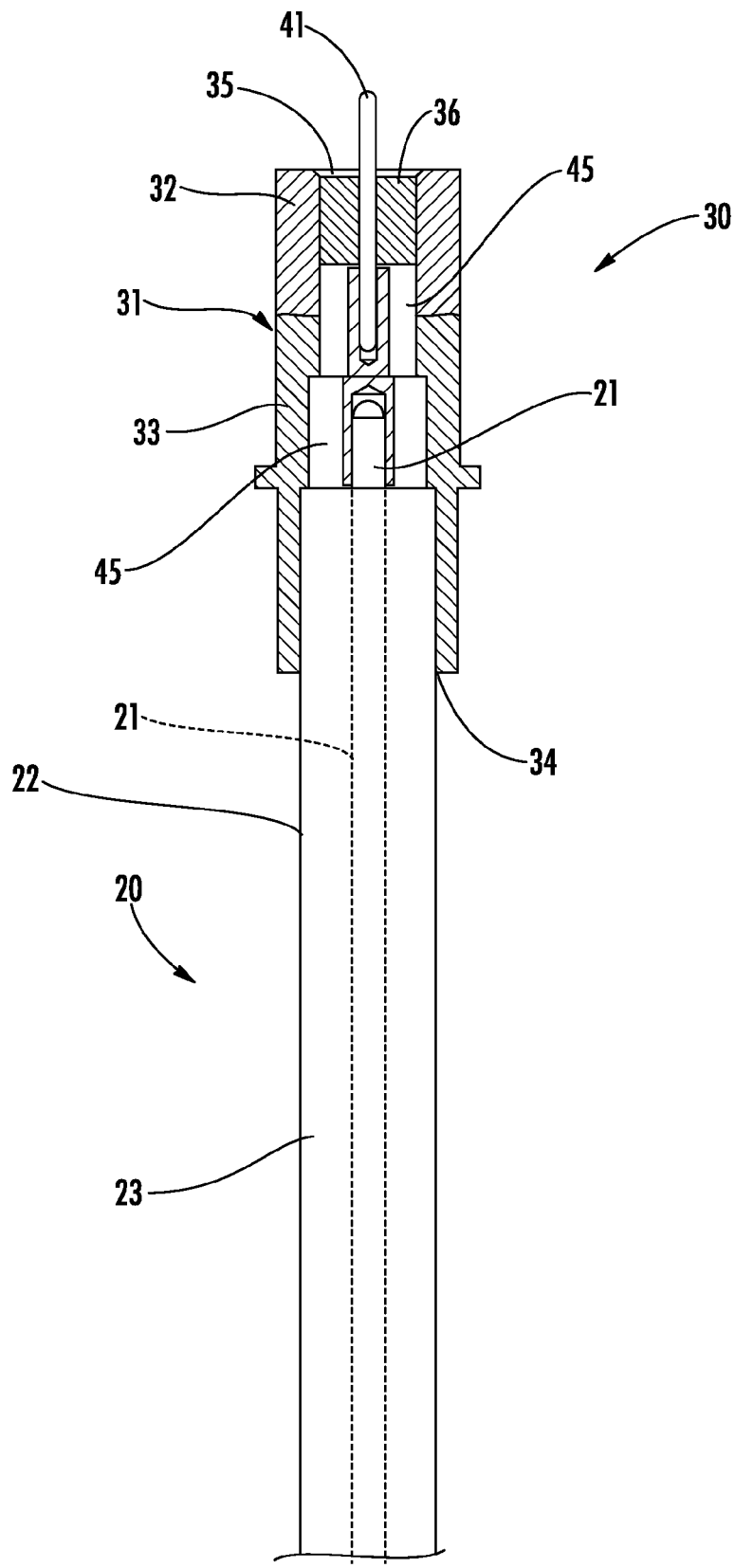
FIG. 1 is schematic partial cross-sectional view of a cable end termination in accordance with an embodiment.
Figure 2:
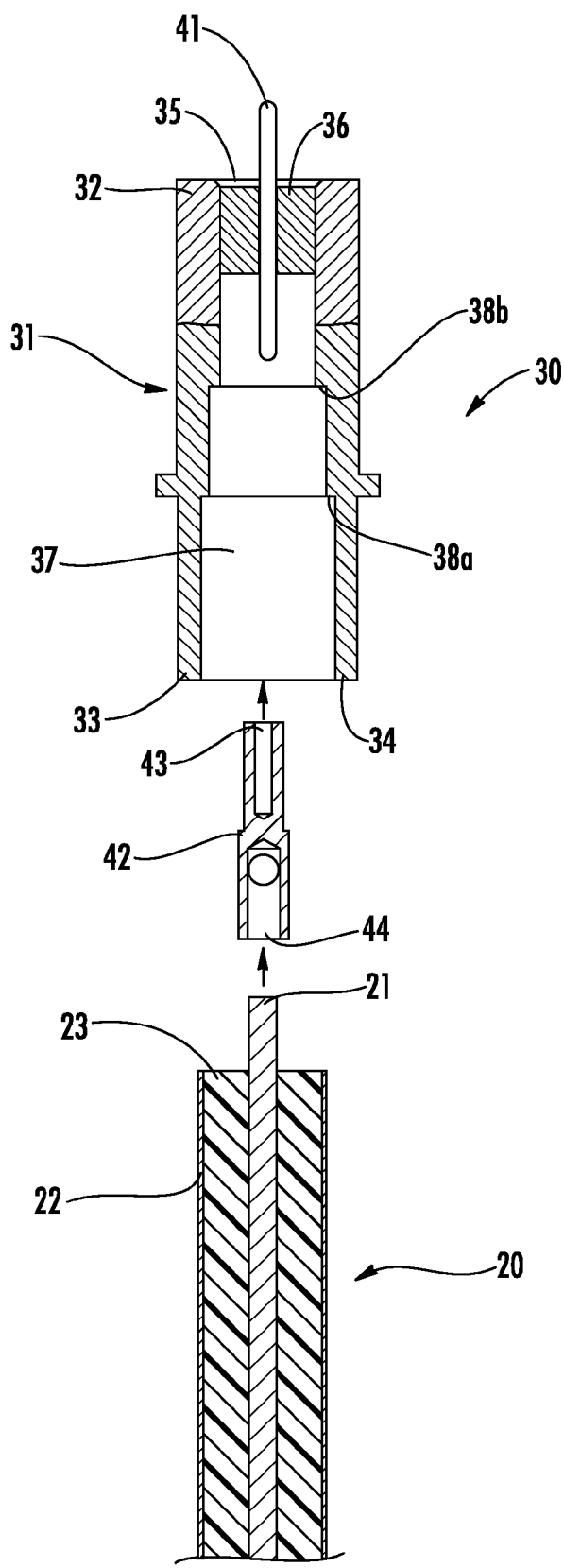
FIG. 2 is an exploded schematic cross-sectional view of the cable end termination of FIG. 1.

Referring initially to FIGS. 1-2, a cable end termination 30 is for a coaxial cable 20 that includes an inner conductor 21, an outer conductor 22, and a dielectric layer 23 therebetween. The coaxial cable 20 may be semi-rigid copper jacketed coaxial cable, for example. The dielectric layer 23 is subject to outgassing in a vacuum environment. For example, the dielectric layer 23 may be polytetrafluoroethylene (PTFE), which in some instances may take upwards of several weeks to outgas. Of course, the dielectric layer 23 may be another type of dielectric material subject to outgassing.

The cable end termination 30 includes a tubular bi-metallic body 31. The tubular bi-metallic body 31 includes a first longitudinal portion 32 and a second longitudinal portion 33 joined with the first longitudinal portion.

The first longitudinal portion 32 includes a first metal, for example, an alloy of iron having a relatively low coefficient of thermal expansion (CTE), iron, nickel, and cobalt (i.e., Kovar). Of course, the first longitudinal portion 32 may include other and/or additional metals. The second longitudinal portion 33 includes a second metal that has a different CTE than the first metal. The second metal may include steel, titanium aluminum, and/or a copper alloy, for example. The second longitudinal portion 33 may include other and/or additional metals. While the first and second metals each have a different CTE, it may be desirable to choose the first and second metals so that the CTEs are relatively close, for example, within ±10%. It may also be desirable that the second metal have a similar expansion rate with the outer conductor 22 of the coaxial cable 20 (e.g. having CTEs within ±10%), and/or the second longitudinal portion 33 be metallurgically compatible with any receiving connector, vacuum housing, or bulkhead, for example. This may advantageously provide the ability to join with the tubular bi-metallic connector body 31. For example, the second metal may be 300-series stainless steel having a CTE of 17.5 ppm/C, and the outer conductor 22 may be a copper alloy having a CTE of 18 ppm/C. Other metals that may be used include copper having a CTE of 18 ppm/C, stainless steel having a CTE in a range of 16-18 ppm/C. In some embodiments, the tubular bi-metallic body 31 may be explosion welded and/or may include more than two metals, for example. The outer conductor 22 or jacket of the coaxial cable 20 may be welded to the bi-metallic body 31, for example, by laser welding or joined with solder.

The tubular bi-metallic body 31 illustratively has first and second opposing ends 34, 35. The first end 34, which is adjacent the second longitudinal portion 33, receives the coaxial cable 20. A stepped passageway 37 extends between the first and second ends 34, 35. The stepped passageway 37 illustratively defines two shoulders 38a, 38b. The coaxial cable 20 is received within the first end 34 and extends to the first shoulder 38a, which defines a stop for the coaxial cable.

The second end 35, which is adjacent the first longitudinal portion 32, carries a dielectric body 36 therewithin and spaced apart from the coaxial cable 20 received at the first end 34. The dielectric body 36 may be glass, for example. Of course, the dielectric body 36 may be another dielectric material. However, it may be desirable to have the CTE of the dielectric body 36 match, for example, be within ±10% of the CTE of the first longitudinal portion 32 or, more particularly, the first metal, e.g., Kovar. For example, Kovar, which is an Fe/Ni/Co alloy may have a CTE of 5.5 ppm/C, while glass may have a CTE of 5 ppm/C. The dielectric body 36 defines a hermetic seal for the dielectric layer 23 of the coaxial cable 20 in the vacuum environment.

As will be appreciated by those skilled in the art, cables that may be used in a vacuum ambient or environment without contaminating the vacuum environment may not be readily available. To be used in a vacuum, such a cable, for example, would have to be fabricated using methods and materials that will not allow optimum electrical performance, especially as the RF frequency increases.

Thus, the cable end termination 30 advantageously permits the coaxial cable 20 to be exposed to a vacuum without regard for outgassing. In other words, the cable end termination 30 may permit the use of standard, relatively high performance, coaxial cable in a vacuum with little if any compromise in performance. As will be appreciated by those skilled in the art, to make a vacuum compatible coaxial cable, there is often a tradeoff or compromise in electrical performance. However, once the end of the coaxial cable 20 is sealed with the cable end termination 30, a non-hermetic connector may be used in the vacuum environment. In other words, the cable end termination 30 may provide a hermetic seal for the dielectric layer 23 in the vacuum environment so that connections may be made using non-hermetic connections that may be available commercially off the shelf.

The cable end termination 30 illustratively includes a center pin contact 41 extending through the dielectric body 36. The center pin contact 41 may be Kovar, for example. The center pin contact 41 couples to a receiving connector, for example, in the vacuum environment, as will be appreciated by those skilled in the art.

A center conductor contact 42 couples the center pin contact 41 to the inner conductor 21 of the coaxial cable 20. The center conductor contact 42 may be copper, for example. The center conductor contact 42 may be another metal. The center conductor contact 42 illustratively includes first and second opposing open ends 43, 44 to slidably receive the center pin contact 41 and the inner conductor 21, respectively. More particularly, the center conductor contact 42 may include a spring contact to accommodate the slidable coupling. A dielectric air gap 45 is between the center pin contact 41 and the center conductor contact 42 and is sized for 50 Ohms. The dielectric air gap 45 may be sized for other impedances, as will be appreciated by those skilled in the art.

While the cable end termination 30 has been described with respect to a single cable end of a coaxial cable, it should be appreciated that both ends of a coaxial cable may be "capped" with the cable end termination. In other words, a seal at both ends of the coaxial cable may be desired for a vacuum tight or hermetic seal.

A method aspect is directed to a method of assembling a cable end termination 30 for a coaxial cable 20 that includes an inner conductor 21, an outer conductor 22, and a dielectric layer 23 therebetween. The dielectric layer 23 is subject to outgassing in a vacuum environment. The method includes coupling a center conductor contact 42 to the inner conductor 21 of the coaxial cable 20. The method also includes coupling the center conductor contact 42 to a tubular bi-metallic body 31 that includes a first longitudinal portion 32 having a first metal and a second longitudinal portion 33 joined with the first longitudinal portion and having a second metal having a different coefficient of thermal expansion (CTE) than the first metal. The tubular bi-metallic body 31 has a first end 34 receiving the coaxial cable and a second end 35 opposite the first end. The tubular bi-metallic body 31 has a dielectric body 36 carried within the second end 35 to define a hermetic seal for the dielectric layer 22 of the coaxial cable 20 in the vacuum environment and a center pin contact 41 extending through the dielectric body.

Another method aspect is directed to a method of making a cable end termination 30 for a coaxial cable 20 that includes an inner conductor 21, an outer conductor 22, and a dielectric layer 23 therebetween. The dielectric layer 23 is subject to outgassing in a vacuum environment. The method includes forming a tubular bi-metallic body 31 that includes a first longitudinal portion 32 having a first metal and a second longitudinal portion 33 joined with the first longitudinal portion and having a second metal having a different coefficient of thermal expansion (CTE) than the first metal. The tubular bi-metallic body 31 is formed to have a first end 34 receiving the coaxial cable 20 and a second end 35 opposite the first end. The method also includes positioning a dielectric body 36 to be carried within the second end 35 to define a hermetic seal for the dielectric layer 23 of the coaxial cable 20 in the vacuum environment. The method also includes positioning a center pin contact 41 to extend through the dielectric body 36 and positioning a center conductor contact 42 to couple the center pin contact 41 to the inner conductor 21 of the coaxial cable 20.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A cable end termination for a coaxial cable comprising an inner conductor, an outer conductor, and a dielectric layer therebetween, the dielectric layer subject to outgassing in a vacuum environment, the cable end termination comprising:
   a tubular bi-metallic body comprising a first longitudinal portion comprising a first metal and a second longitudinal portion joined with said first longitudinal portion and comprising a second metal having a different coefficient of thermal expansion (CTE) than the first metal;
   the tubular bi-metallic body having a first end receiving the coaxial cable and a second end opposite the first end;
   a dielectric body carried within the second end to define a hermetic seal for the dielectric layer of the coaxial cable in the vacuum environment;
   a center pin contact extending through said dielectric body; and
   a center conductor contact coupling the center pin contact to the inner conductor of the coaxial cable.

2. The cable end termination of claim 1 wherein said center conductor contact has opposing first and second openings to slidably receive the inner conductor and the center pin contact therein, respectively.

3. The cable end termination of claim 1 wherein at least one of the first and second metals has a CTE within ±10% of said dielectric body.

4. The cable end termination of claim 1 wherein at least one of the first and second metals has a CTE within ±10% of the outer conductor of the coaxial cable.

5. The cable end termination of claim 1 wherein the tubular bi-metallic body has a stepped passageway between the first and second ends.

6. The cable end termination of claim 5 wherein the stepped passageway defines at least one shoulder for receiving the coaxial cable thereagainst.

7. The cable end termination of claim 1 wherein said dielectric body comprises glass.

8. The cable end termination of claim 1 wherein at least one of the first and second metals comprises nickel, cobalt, iron, titanium, aluminum, steel, and copper.

9. A method of assembling a cable end termination for a coaxial cable comprising an inner conductor, an outer conductor, and a dielectric layer therebetween, the dielectric layer subject to outgassing in a vacuum environment, the method comprising:
   coupling a center conductor contact to the inner conductor of the coaxial cable; and
   coupling the center conductor contact to a tubular bi-metallic body comprising a first longitudinal portion comprising a first metal and a second longitudinal portion joined with the first longitudinal portion and comprising a second metal having a different coefficient of thermal expansion (CTE) than the first metal, the tubular bi-metallic body having a first end receiving the coaxial cable and a second end opposite the first end, and the tubular bi-metallic body having a dielectric body carried within the second end to define a hermetic seal for the dielectric layer of the coaxial cable in the vacuum environment and a center pin contact extending through the dielectric body.

10. The method of claim 9 wherein coupling the center conductor contact comprises coupling a center conductor contact having opposing first and second openings to slidably receive the inner conductor and the center pin contact therein, respectively.

11. The method of claim 9 wherein at least one of the first and second metals has a CTE within ±10% of the dielectric body.

12. The method of claim 9 wherein at least one of the first and second metals has a CTE within ±10% of the outer conductor of the coaxial cable.

13. The method of claim 9 wherein the tubular bi-metallic body has a stepped passageway between the first and second ends.

14. The method of claim 13 wherein the stepped passageway defines at least one shoulder for receiving the coaxial cable thereagainst.

15. A method of making a cable end termination for a coaxial cable comprising an inner conductor, an outer conductor, and a dielectric layer therebetween, the dielectric layer subject to outgassing in a vacuum environment, the method comprising:
   forming a tubular bi-metallic body comprising a first longitudinal portion comprising a first metal and a second longitudinal portion joined with the first longitudinal portion and comprising a second metal having a different coefficient of thermal expansion (CTE) than the first metal, the tubular bi-metallic body being formed to have a first end receiving the coaxial cable and a second end opposite the first end;
   positioning a dielectric body to be carried within the second end to define a hermetic seal for the dielectric layer of the coaxial cable in the vacuum environment;
   positioning a center conductor contact to extend through the dielectric body; and positioning a center pin contact to couple the center pin contact to the inner conductor of the coaxial cable.

16. The method of claim 15 wherein at least one of the first and second metals has a CTE within ±10% of the dielectric body.

17. The method of claim 15 wherein at least one of the first and second metals has a CTE within ±10% of the outer conductor of the coaxial cable.

18. The method of claim 15 wherein the tubular bi-metallic body is formed to have a stepped passageway between the first and second ends.

19. The method of claim 18 wherein the stepped passageway is formed to define at least one shoulder for receiving the coaxial cable thereagainst.

20. The method of claim 15 wherein positioning the dielectric body comprises positioning a dielectric body comprising glass.

* * * * *